United States Patent Office 2,957,004
Patented Oct. 18, 1960

2,957,004

Bz-PHENYL METAL PHTHALOCYANINE PRECURSORS

Melvin A. Perkins, Brandywine, Del., Aaron Oken, Chadds Ford, Pa., and Myron S. Whelen, Brandywine Hundred, Del., assignors to E. I. du Pont de Nemours and Company, Wilmington, Del., a corporation of Delaware No Drawing. Filed Oct. 30, 1957, Ser. No. 693,248

6 Claims. (Cl. 260—314.5)

This invention relates to novel organic complex compounds which are useful in the production of greenish blue to green metal phthalocyanine compounds. More particularly, this invention concerns copper- and nickel-phthalocyanine precursors which bear phenyl substituents on the benzene rings, and which are readily convertible into corresponding Bz-phenyl metal phthalocyanines.

The precursor for a metal-phthalocyanine may be defined as an alcohol-soluble complex compound, containing more than 4 phthalonitrile units per molecule and which has no tinctorial qualities in itself, but which upon heating or upon being treated with reducing agents yields a metal-phthalocyanine. In the case of copper-phthalocyanine precursor, the compound may be expressed by the formula $$Cu(C_8H_4N_2)_6 \cdot NH$$

wherein the six units in parentheses may be looked upon as phthalonitrile units, the precursors being in fact capable of being formed by reacting 6 moles of phthalonitrile with 1 mole of a cupric salt in an inert organic solvent saturated with ammonia. Such a process is described and claimed in U.S.P. 2,772,284 (Barnhart and Skiles). According to an improvement of A. C. Stevenson (U.S.P. 2,772,283), the reaction is facilitated by feeding into the mass an oxygen supplying gas at a specified rate, and the entire reaction is conducted at a temperature in the range of 55 to 95° C. A further improvement upon the process is disclosed in U.S.P. 2,782,207 (Perkins and Whelen). In U.S.P. 2,772,285 (R. A. Brooks), a copper-phthalocyanine precursor of similar properties and apparently the same constitution is obtained by heating in an inert solvent, at a temperature less than 90° C., 6 moles of 1,3-di-iminoisoindoline and 1 mole of a copper salt such as cupric chloride or acetate.

The practical merits of the precursor reside in the fact that whereas copper-phthalocyanine itself is too insoluble to be applied by customary methods to textile fibers, the precursor can be readily applied to textile fibers from an organic-solvent dye bath, and can be readily converted on the fiber into copper phthalocyanine by a simple heating of the fiber, or by treatment with reducing agents.

An analogous calcium derivative is obtained from phthalonitrile in U.S.P. 2,681,348 (R. A. Brooks). This calcium containing precursor yields metal-free phthalocyanine upon reduction with ascorbic acid.

It is an object of this invention to widen the range of shades producible on textile fibers by means of the precursor technique.

Another object is to produce novel metal-phthalocyanine precursors which develop into corresponding metal phthalocyanines of greenish blue to green colors, and which are therefore adapted for shading the blue colors obtainable by standard copper- or nickel-phthalocyanine precursors. Additional objects and achievements of this invention will appear as the description proceeds.

According to this invention novel precursor compounds of the copper and nickel phthalocyanine series are produced, which distinguish from the copper and nickel precursors of Barnhart and Skiles by having phenyl as a substituent in at least one of the Bz rings, and by producing on the fiber dyes of shades varying from turquoise blue to green. The novel precursors are also distinguished by having only 5 phthalonitrile units in their complex formula as compared to the 6 units which characterize copper-phthalocyanine precursor. More particularly, the novel compounds of this invention are characterized by the following structural formula

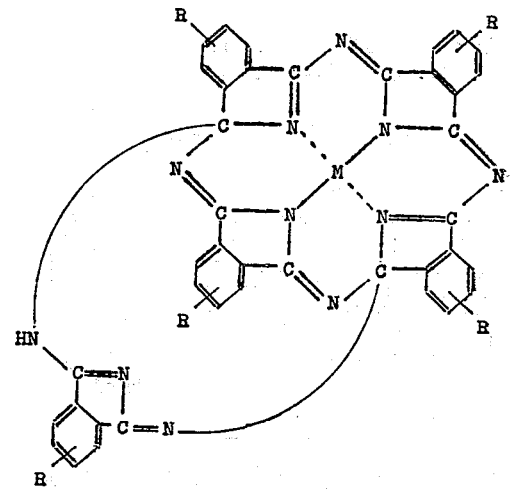

wherein M designates copper or nickel, and wherein one of the R's stands for the phenyl radical $C_6H_5$, while the remaining R's represent hydrogen or phenyl.

For simplicity of handling, the above structural formula may be condensed into the semi-empirical form $$M(R-C_8H_3N_2)_5 \cdot NH$$

wherein M designates copper or nickel, while R—$C_8H_3N_2$ represents a phthalonitrile unit substituted in the Bz-nucleus by a member R as above defined.

Our novel compounds may be prepared by the two general processes established by the above cited are for the preparation of unsubstituted copper-phthalocyanine precursor, namely:

I. From phenyl phthalonitrile (or a mixture of phenyl phthalonitrile and unsubstituted phthalonitrile) by reacting the same with a cupric or nickel salt and ammonia, in a solvent of the group consisting of dimethyl formamide, dimethyl acetamide and lower alkyl monoethers of monoethylene and diethylene glycol (the "Cellosolves" and "Carbitols"), in the presence of a catalyst or promoter of the group consisting of urea, biuret, guanidine, piperidine, triethanolamine, methyl glucamine, iminophthalimidine and 1,3-diiminoisoindoline, and while feeding into the reaction mass air or a mixture of air and ammonia.

II. From Bz-phenyl-1,3-diimino-isoindoline (or a mixture thereof with unsubstituted 1,3-diimino-isoindoline) by reacting the same with a cupric or nickel salt in a solvent of the group consisting of dimethyl formamide, dimethyl acetamide, lower alkyl monoethers of the monoethylene and diethylene glycol, nitrobenzene, o-dichlorobenzene, 1,2,4-trichlorobenzene or kerosene.

In either process above, the solvent may be diluted with considerable quantities of an alcohol such as methanol, ethanol, isopropanol or tertiary butanol, provided the amount of principal solvent is sufficient to dissolve the reactants in the absence of the auxiliary alcohol.

The temperature of the reaction is preferably in the range of 60° to 95° C.

It will be noted that no ammonia is needed initially in process II. Nor is any promoter needed in this case. However, better yields are often obtained if the cupric or nickel salt employed is first converted into its amine form by the aid of ammonia.

The novel precursor compounds having less than 5 pendent phenyl rings per molecule may also be prepared by reacting various mixtures of phenyl phthalonitrile with unsubstituted 1,3-diiminoisoindoline or of Bz-phenyl-1,3-diiminoisoindoline with unsubstituted phthalonitrile. In such cases, ammonia is added and the entire procedure is preferably run according to general process I above outlined.

In any of the processes above, the product may be recovered by drowning the reaction mass in water, filtering and drying; but a preferred procedure is to drown the reaction mass in water, filter off the precursor, slurry the same in a low boiling, water-miscible alcohol, for instance methanol, and then dry at a temperature not exceeding 60° C.

The products of this invention may be used per se in the dyeing and printing of textile fibers, producing turquoise blue to green dyeings or prints.

A more important practical use, however, of our novel precursor is for shading the blue colors obtained by dyeing and printing with copper phthalocyanine precursor, nickel phthalocyanine precursor and metal-free phthalocyanine precursor obtained from unsubstituted phthalonitrile or iminoisoindoline material, according to the hereinabove referred to patents.

Without limiting this invention, the following examples are given to illustrate our preferred mode of operation. Parts mentioned are by weight.

EXAMPLE 1

*Pentaphenyl copper-phthalocyanine precursor*

Cu(C$_6$H$_5$.C$_8$H$_3$N$_2$)$_5$.NH

A mixture of 625 parts of dimethyl formamide containing 13.2 parts of anhydrous cupric chloride was saturated with gaseous ammonia at 25° C. followed by the addition of 5 parts of methyl glucamine and 100 parts of 4-phenylphthalonitrile (Haworth et al., J. Chem. Soc., 1945, page 411). The mixture was heated at 80° to 85° C. for 2 hours while a slow stream of air was bubbled through it. The reaction mixture was clarified by hot filtration and the filtrate was poured into 2000 parts of water. The precipitated precursor was collected and air dried.

When printed on cotton as indicated below, the precursor thus obtained gave attractive fast green prints of copper tetra-(4)-phenylphthalocyanine.

When the cupric chloride in this example is replaced by an equivalent amount of nickel chloride, the analogous nickel-containing precursor is obtained which gives the corresponding green nickel tetra-(4)-phenylphthalocyanine on reduction.

The same products are obtained in this example, but in lower yield based on 4-phenylphthalonitrile, when less metal chloride is employed, e.g., 12.5 parts. Likewise, similar results are obtained when the reaction temperature is raised to 90° to 93° C.

EXAMPLE 2

*Pentaphenyl copper-phthalocyanine precursor*

A mixture of 25 parts of 5-phenyl-1,3-diiminoisoindoline and 4.0 parts of copper sulfate monohydrate was added to 95 parts of dimethyl formamide. The resulting suspension was gassed with ammonia until saturated at room temperature and was then heated to 80° C. and agitated at that temperature for 2 hours.

The reaction mixture was then clarified by filtration and the filtrate was drowned in 250 parts of water. The light tan-colored product, which precipitated upon drowning, was isolated by filtration. The filter cake was washed with 5000 parts of water and then slurried in 120 parts of methanol for one hour. The crystalline product was filtered, washed with 50 parts of methanol and air dried at room temperature. The precursor was thus obtained as a light tan powder in good yield.

When reduced with ascorbic acid in boiling ethylene glycol monomethyl ether or in boiling dimethyl formamide the above precursor was converted to copper tetra-(4)-phenylphthalocyanine.

In the process of this example, other solvents may be employed e.g. ethylene glycol monoethyl ether, and other copper salts may be used e.g. cupric chloride or cupric acetate.

The preferred temperature range for this process is 60° to 80° C., although traces of the precursor form in the reaction mixture at temperatures as low as 25° C. At temperatures appreciably above 90° C., the product decomposes, yielding copper tetra-(4)-phenylphthalocyanine.

The 5-phenyl-1-amino-3-iminoisoindolenine used as initial material in this example was obtained by preparing first the nitrate of this compound according to Example 18 of U.S.P. 2,727,043 (wherein this product is referred to as the nitrate of 1-amino-3-imino-5-phenylisoindolenine) and then liberating the free base according to Example 2 of the same patent.

EXAMPLE 3

A mixture of 14 parts of the nitrate of 5-phenyl-1-amino-3-iminoisoindolenine (U.S.P. 2,727,043, Example 18) and 1.35 parts of anhydrous cupric chloride was suspended in 100 parts of ethylene glycol monoethyl ether. The resulting slurry was saturated with ammonia gas, heated to 80° C. and treated with 2.0 parts of sodium hydroxide dissolved in 50 parts of hot ethylene glycol monoethyl ether. The reaction mass was agitated at 80° C. for 45 minutes. Ammonia was evolved. The mass was clarified by filtration and the filtrate was drowned in 1000 parts of cold water. The precipitated product was filtered off, washed with 1000 parts of water, then slurried in 50 parts of methanol for 1 hour, again filtered, washed with 10 parts of methanol and finally dried below 50° C. The precursor was thus obtained as a tan-colored powder.

Reduction of the precursor with ascorbic acid in boiling ethylene glycol monoethyl ether gave copper tetra-(4)-phenylphthalocyanine.

EXAMPLE 4

*Pentaphenyl nickel-phthalocyanine precursor*

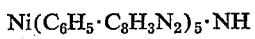

Ni(C$_6$H$_5$·C$_8$H$_3$N$_2$)$_5$·NH 22 parts of 5-phenyl-1,3-diiminoisoindoline were added to 85 parts of dimethyl formamide containing 4.8 parts of NiCl$_2$·6H$_2$O. The mixture was agitated and gassed with ammonia until saturated and then heated at 70° C. for 1 hour. The reaction mass was then clarified by filtration and the filtrate was drowned in 800 parts of water. The precipitate which formed was filtered off and, after washing with 2000 parts of water, the filter cake was slurried in 100 parts of methanol at 25° to 30° C. for 1.5 hours. The product, now in crystalline form, was filtered off, washed with 25 parts of methanol and dried below 50° C. The brown powder obtained was the precursor of nickel tetra-(4)-phenylphthalocyanine. It dissolves to a brown color in dimethyl formamide and is converted to the corresponding pigment when reduced with ascorbic acid in hot ethylene glycol monomethyl ether.

When printed onto cotton fiber, by the method indicated below, the precursor thus obtained gave strong green prints of nickel tetra-(4)-phenylphthalocyanine.

EXAMPLE 5

*Intermolecular condensation of substituted and unsubstituted starting materials of like species*

(A) Mol ratio of phenyl substituted to unsubstituted=1.92:3.08.

To 94 parts of dimethyl formamide were added 13 parts of 1,3-diiminoisoindoline, 12.1 parts of 5-phenyl-1,3-diiminoisoindoline and 5.1 parts of $CuSO_4 \cdot H_2O$. The mixture was agitated and saturated with ammonia gas below 40° C. and then heated to 80° C. and maintained at 80° to 85° C. for 1.5 hours. The reaction mass was clarified by filtration at 80° C. to remove about 0.1 part of insoluble matter. The filtrate was poured into 500 parts of water at 25° to 50° C. and the precipitated precursor was filtered off. The filter cake was washed well with water to remove dimethylformamide and it was then slurried in 40 parts of methanol at 20° to 25° C. for 1.5 hours. The crystalline precursor was then filtered off, washed with 12 parts of methanol and dried below 50° C.

This product printed and dyed on cotton in very strong, bright shades of turquoise blue, being much greener than the dyeings of copper phthalocyanine obtained from the unsubstituted precursor of Barnhard and Skiles, U.S.P. 2,772,284. The dyeings and prints exhibited excellent fastness properties.

(B) Mol ratio of phenyl substituted to unsubstituted=3.33:1.67.

The process described in part (A) of this example was repeated except that the 5 mols of starting material were distributed as follows:

3.33 mols of 5-phenyl-1,3-diiminoisoindoline and 1.69 mols of 1,3-diiminoisoindoline.

The precursor obtained gave a pigment of higher pendent-phenyl content, as evidenced by the fact that its shades, on dyed and printed cotton, were greener as compared with those obtained in part (A).

EXAMPLE 6

*Intermolecular condensations of substituted and unsubstituted starting materials of unlike species*

3.33 MOLS PHTHALONITRILE : 1.67 MOLS 5-PHENYL-1,3-DIIMINOISOINDOLINE

An agitated mixture of 94 parts of dimethyl formamide, 5.3 parts of $CuSO_4 \cdot H_2O$, 12.8 parts of phthalonitrile and 2 parts of methyl glucamine was saturated with ammonia gas below 40° C. The mass was then heated to 90° C. and, after the first indication of precursor formation (not over a few minutes), 11 parts of 5-phenyl-1,3-diiminoisoindoline were added. After agitation at 85° to 87° C. for 1.5 hours, the reaction mass was clarified by hot filtration and the residue was washed with dimethyl formamide. The filtrate was drowned in 500 parts of water, the precipitated precursor was filtered off and washed well with water. The filter cake was slurried in 40 parts of methanol at 25° to 30° C. for 2 hours, again filtered and finally washed with 12 parts of methanol and dried below 50° C. 20 parts of a light tan colored powder having a slight green cast were obtained.

This precursor dyes and prints cotton in fast, turquoise-blue shades which are much greener than the shade of copper phthalocyanine.

NOTE.—The precursor formation above mentioned is observed by the ascorbic acid spot test. A spot of the reaction mass on paper is yellowish and remains yellow after treatment with a 5% solution of ascorbic acid in the monoethyl ether of ethylene glycol. When precursor starts to form, the ascorbic acid spot test will show a trace of blue.

EXAMPLE 7

*Monophenyl copper-phthalocyanine precursor*

Precursor in which one R is phenyl, 4 R's are H.

An intimately ground mixture of 58 parts (0.4 mole) of 1,3-diiminoisoindoline, 22.1 parts (0.1 mole) of 5-phenyl-1,3-diiminoisoindoline and 17.7 parts (0.1 mole) of cupric sulfate monohydrate was added to 250 parts of dimethyl formamide. Ammonia was then passed in at 30° to 40° C. until the mixture was saturated. The temperature was raised to 80° C. and the mixture was stirred at 80° to 85° C. for ninety minutes. It was filtered at 80° C. to remove a small amount of insoluble material and the filtrate was poured into 1500 parts of water. A buff-colored material which precipitated was collected by filtration, washed with 200 parts of hot water and then slurried for 30 minutes in 300 parts of methanol. After filtration from the methanol, the product was washed with 100 parts of fresh methanol and dried at 25° to 30° C. in a vacuum.

When applied to cotton from aqueous "Carbitol" (diethylene glycol monoethyl ether), dried and reduced with sodium hydrosulfite, this precursor produced bright greenish-blue dyeings of excellent fastness to light and washing.

By following the procedure of Examples 5, 6 and 7 except using nickel chloride in lieu of copper sulfate, the corresponding nickel precursors of various phenyl contents per molecule may be obtained.

It will be understood that the details of the above examples may be varied widely without departing from the spirit of this invention. Thus, in lieu of the particular salt named in any of the above examples other cupric salts or nickel salts may be employed. In general, cupric sulfate, chloride, nitrate, acetate and the corresponding nickel salts are satisfactory.

In lieu of methyl glucamine in Example 1, any other of the above indicated list of precursor-synthesis catalysts may be employed.

In the process which employs phenyl-1,3-diimino-isoindoline in its initial materials, the same may be prepared and isolated in advance (as shown in Example 2), or it may be liberated in situ from its nitrate by the aid of sodium hydroxide (as shown in Example 3).

Numerous other variations in detail will be readily apparent to those skilled in this art.

The novel compounds of this invention are readily converted to the corresponding Bz-phenyl metal phthalocyanines by heating in the absence of reducing agents at a temperature above 120° C., or by heating at lower temperatures in the presence of reducing agents typified by sodium or potassium bisulfite, sodium hydrosulfite, ascorbic acid, etc.

In the application of our novel compounds to textile fibers, the dyeing is preferably done from an organic padding bath at a temperature below 110° C., the padding bath containing a reducing agent whose redox potential is not less than −1.00 volt. As preferred solvents for the dye bath may be mentioned the "Cellosolves" and "Carbitols" (these are lower alkyl ethers, respectively, of monoethylene and diethylene glycol), while the number of available reducing agents is vast and is typified by the reducing agents hereinabove specifically named.

Printing on the other hand is preferably achieved by the aid of a printing paste containing, beside the color-precursor and the customary thickening paste, a solvent such as a "Carbitol" (as above defined), triethanolamine, and optionally sodium sulfite. The printing process is then followed by drying for about 1 minute at 105° to 110° C. and aging in neutral or acid steam for about 5 minutes.

We are aware of U.S. Patent 2,683,643 wherein a complex derivative of 3,4-dicyano diphenyl was prepared in Example 65. The latter product is, however, of an entirely different structure, and of different physical and chemical properties, and it requires different modes of application to textile fiber. Thus in Example 65 of the patent, a salt of copper in the cuprous form was employed, and the solvent there was pyridine. Both of these conditions are inapplicable to the production of the novel compounds of this invention. Furthermore, we have synthesized the product of said Example 65 and found the same insoluble in toluene, whereas the products of this invention are soluble to the extent of 10 grams per 100 cc. of toluene (at 40° C.). We have also found significant differences in the spectra between the product of Example 65 of the patent and the products of this invention, both under ultraviolet light and under infrared light. Finally, the product of the patent when spotted on paper and treated with 5% ascorbic acid in a mixture of water and ethyl "Cellosolve" at room temperature, produces a barely greenish tinted yellow spot, whereas the compounds of this invention produce instantly a deeply tinted green spot.

We claim as our invention:

1. A metal phthalocyanine precursor of the structure

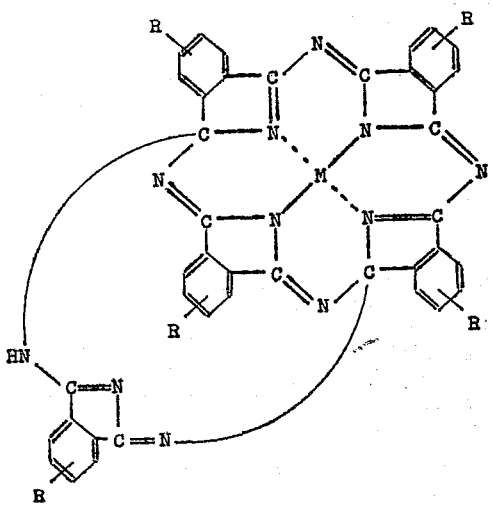

wherein M is a metal of the group consisting of copper and nickel, at least one of the R's is phenyl, while the remaining R's are members of the group consisting of hydrogen and phenyl, said precursor being characterized by being soluble in alcoholic solvents and in toluene and by yielding the corresponding phenyl substituted metal phthalocyanine upon being heated to a temperature above 120° C.

2. A copper phthalocyanine precursor of the structure

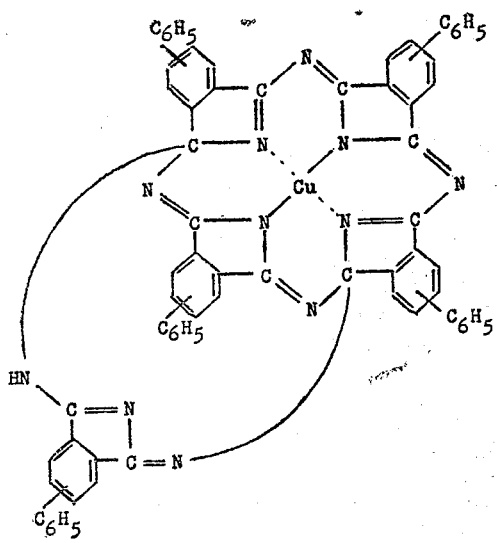

wherein $C_6H_5$ designates the phenyl radical, said precursor being characterized by being soluble in alcoholic solvents and in toluene and by yielding copper tetra-(4)-phenyl phthalocyanine upon being treated with a reducing agent.

3. A copper phthalocyanine precursor of the structure

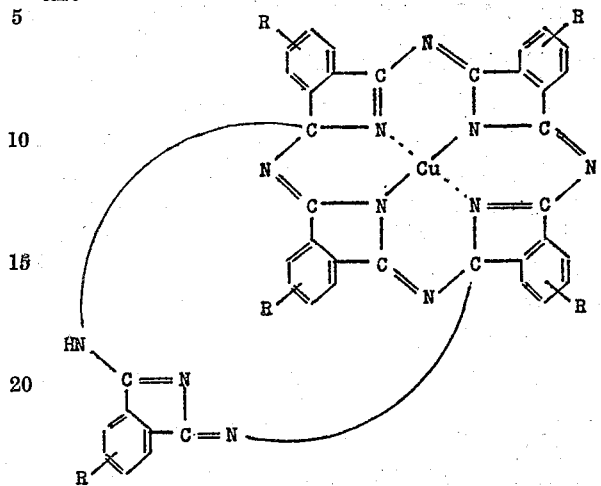

wherein four of the R's designate hydrogen while one of them designates the phenyl radical $C_6H_5$, said precursor being characterized by being soluble in alcoholic solvents and in toluene and by yielding a Bz-phenyl copper phthalocyanine upon being treated with a reducing agent.

4. The process of producing a metal phthalocyanine precursor, which comprises reacting Bz-phenyl phthalonitrile with ammonia and a metal salt of the group consisting of cupric salts and nickel salts, the reaction being effected by heating the reactants at a temperature between 60° and 95° C., in a water-soluble, inert organic liquid of the group consisting of dimethyl formamide, dimethyl acetamide and lower monoalkyl ethers of monoethylene and diethylene glycols and in the presence of a precursor-synthesis catalyst and of an oxygen supplying gas.

5. The process of producing a metal phthalocyanine precursor, which comprises reacting together a member of the group consisting of phthalonitrile and 1,3-diiminoisoindoline, a member of a group consisting of phenylphthalonitrile and Bz-phenyl-1,3-diiminoisoindoline, ammonia, and a metal salt of the group consisting of cupric salts and nickel salts, the reaction being effected by heating the reactants at a temperature between 60° and 95° C., in a water-soluble, inert organic liquid of the group consisting of dimethyl formamide, dimethyl acetamide and lower monoalkyl ethers of monoethylene and diethylene glycols and in the presence of a precursor-synthesis catalyst and of an oxygen supplying gas, the quantities of said initial materials reacted together being substantially 5 to 6 moles total of said aromatic reactants for each mole of said metal salt.

6. The process of producing a metal phthalocyanine precursor, which comprises reacting Bz-phenyl-1,3-diiminoisoindoline, with a metal salt of the group consisting of cupric salts and nickel salts, the reaction being effected at a temperature between 60° and 95° C. and in an organic solvent selected from the group consisting of dimethyl formamide, dimethyl acetamide, lower alkyl monoethers of monoethylene and diethylene glycol, nitrobenzene, o-dichlorobenzene, 1,2,4-trichlorobenzene and kerosene.

References Cited in the file of this patent

UNITED STATES PATENTS

| | | |
|---|---|---|
| 2,683,643 | Bauman et al. | July 13, 1954 |
| 2,772,284 | Barnhart et al. | Nov. 27, 1956 |
| 2,782,207 | Perkins et al. | Feb. 19, 1957 |

FOREIGN PATENTS

| | | |
|---|---|---|
| 745,359 | Great Britain | Feb. 22, 1956 |

UNITED STATES PATENT OFFICE
CERTIFICATE OF CORRECTION

Patent No. 2,957,004                                   October 18, 1960

Melvin A. Perkins et al.

It is hereby certified that error appears in the printed specification of the above numbered patent requiring correction and that the said Letters Patent should read as corrected below.

Column 1, line 50, after "customary" insert -- dyeing --; column 2, line 42, for "are" read -- art --; column 5, line 63, for "recation" read -- reaction --.

Signed and sealed this 11th day of April 1961.

(SEAL)

Attest:

ERNEST W. SWIDER
Attesting Officer

ARTHUR W. CROCKER
Acting Commissioner of Patents